UNITED STATES PATENT OFFICE.

WILLIAM C. A. RŒTTGERR, OF BRUSSELS, BELGIUM.

IMPROVEMENT IN ARTIFICIAL FUEL.

Specification forming part of Letters Patent No. 190,724, dated May 15, 1877; application filed December 4, 1874.

*To all whom it may concern:*

Be it known that I, WILLIAM CHARLES ARTHUR RŒTTGERR, of Brussels, in the Kingdom of Belgium, manufacturer, have invented certain Improvements in the Manufacture of Artificial Fuel, of which the following is a specification:

This invention relates to the manufacture of artificial fuel from coal dust or slack, lignite, coke, cinders and other carbonaceous matters, and from saw-dust, peat, tan, or any other vegetable matter which may be used as fuel.

According to some processes by which artificial fuel has been manufactured, the carbonaceous particles or other matters have been cemented by means of a mixture of a hydraulic or a plastic cement and silicate of soda or silicate of potash, and then molded into blocks.

Artificial fuel thus made is, however, defective in the following respects: The blocks are brittle, and, consequently, will not bear transporting or stoking. The use of ordinary cements adds alumina or other bulk to the fuel, and thereby increases the proportion of incombustible matter, and the fuel forms clinkers, is apt to give off smoke, and, when stored, is apt to form choke-damp or fire-damp.

Now, the object of these improvements is to produce a cheap fuel free from these and other defects, for which purpose the procedure is as follows:

In order to cement the matters to be used as fuel, a cement is made by mixing ferruginous lime with as little trace as possible of alumina or magnesia, and silicate of potash or silicate of soda with excess of alkali; or, when these are too costly, the gelatinous silica hereinafter described.

When ordinary ferruginous lime is used, about eighty-eight parts (by weight) thereof are mixed with four to eight parts (by weight) of silicate of soda, or silicate of potash, or gelatinous silica, having alkali in excess, and the mixture is then made into a hydraulic cement in the usual way.

To this cement, previous to being used as a binding material in this process, about four parts of powdered unslacked poor lime are added. From four and a half to nine parts of the silicate of lime-cement thus made are added to, say one hundred parts of coal or coke dust or to cinders, reduced by crushing or sifting to a small size, and are intimately mixed therewith, the mixture being then moistened with water containing a slight percentage of gelatinous silica, which may be produced artificially or drawn from clay by means of acids and a sal-ammoniac solution. The said mixture is then immediately compressed into blocks by hand or machine. The blocks are then allowed to set, and in a few hours they will be hard and fit for use on the spot. When, however, they are intended to be transported to a distance, they are, after they have set, dipped into a bath of silicate of soda, or silicate of potash, or the above-mentioned silica in solution, and are then allowed to dry. They will then be hard and bear transportation, and will not crumble nor trickle when stirred in the furnace.

This process can, however, be entirely dispensed with where steam or hydraulic pressure is used in the manufacture of the blocks, and where the slack has been reduced by sifting or pounding into a fine powder.

It is preferable to use a lime free from alumina or magnesia in the manufacture of the improved cement hereinbefore described, as it is well adapted to this process; but any other lime containing iron and only minute traces of alumina or magnesia may be used instead.

Artificial fuel, made as hereinbefore described, does not clinker or emit smoke or sulphurous fumes when burned, nor give off choke-damp or fire-damp when stored. For this reason it is not liable to spontaneous combustion. The gases emitted by its combustion are not injurious to health, nor do they attack metals so as to decompose them. Every particle of carbonaceous matter being enveloped in a coating of silicate of lime, resists moisture and the influence of the atmosphere, and is not, therefore, decomposed by exposure to either.

Having thus fully described my invention, and in what manner the same is to be performed, I wish it to be understood that I do not confine myself to the precise details here- inbefore described, as the same may be varied without departing from the nature of my invention; but

What I claim as new, and desire to secure by Letters Patent, is—

The artificial fuel described, consisting of pulverized and sifted coal or coke dust, or similar carbonaceous material, united by a cement composed of ferruginous lime prepared with soluble silica having an excess of alkali, the compound being formed into blocks, as and for the purpose described.

W. C. A. RŒTTGERR.

Witnesses:
R. S. KIRKPATRICK,
W. H. KIRKPATRICK.